U.S. Patent   May 25, 1982   4,331,122
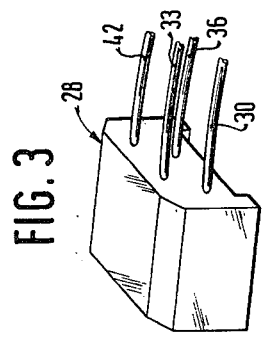
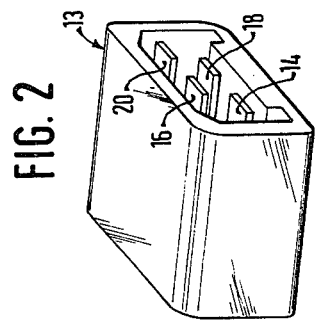
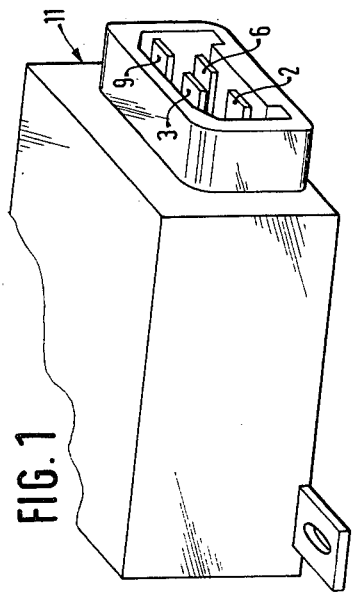
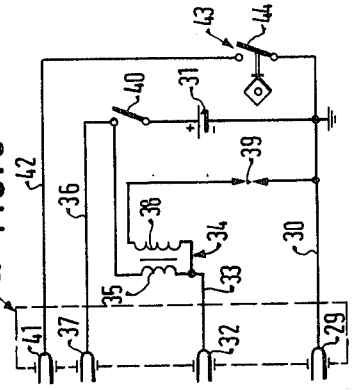
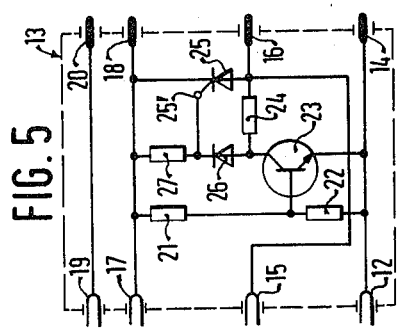
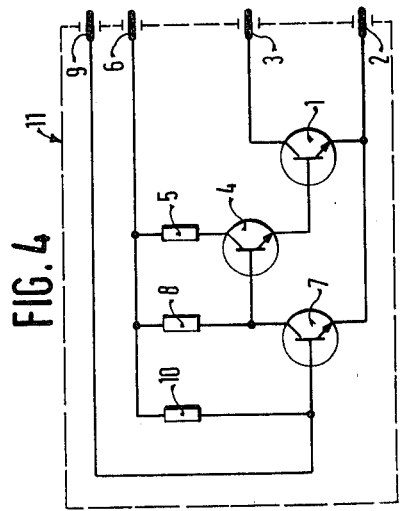

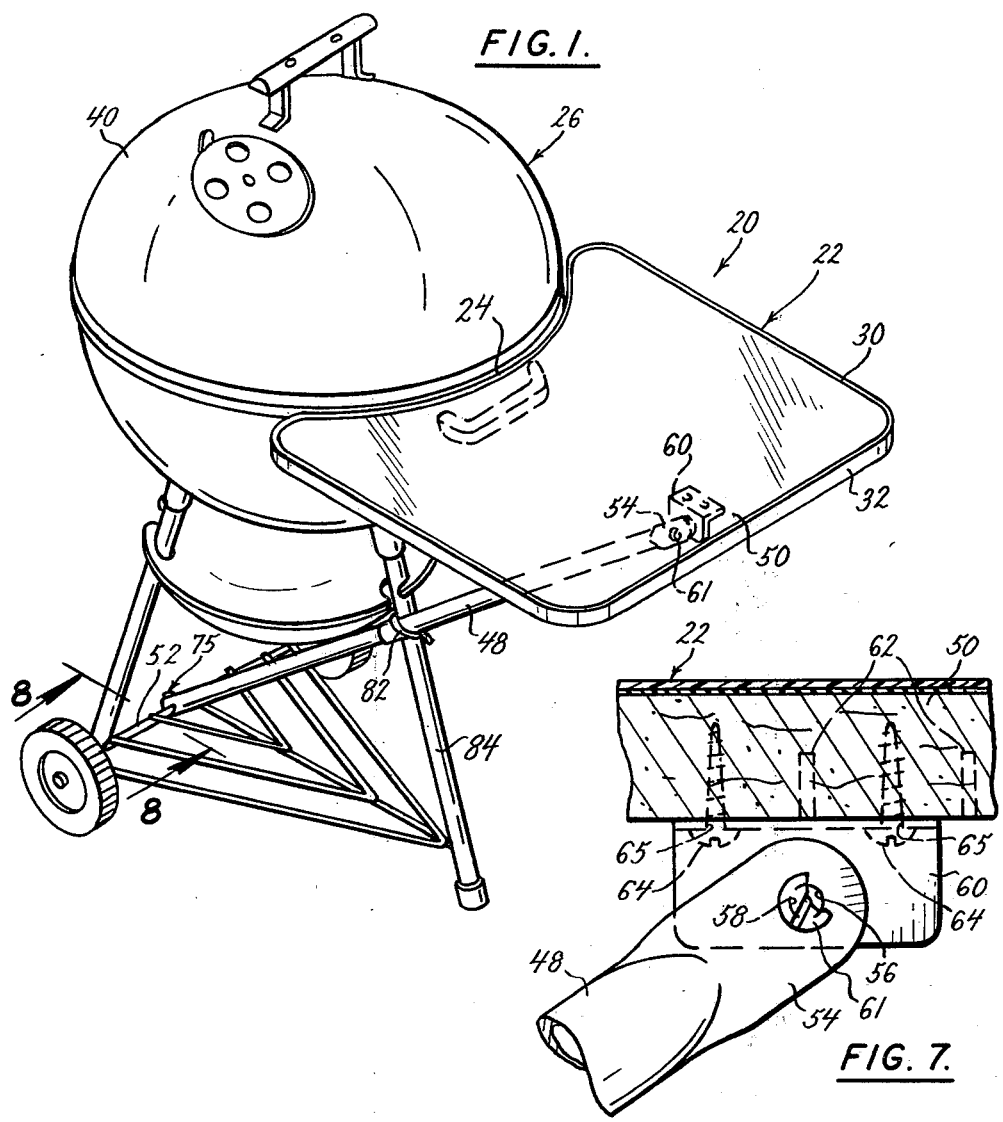
FIG. 1.
FIG. 7.
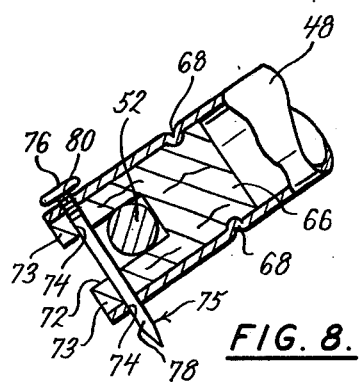
FIG. 8.
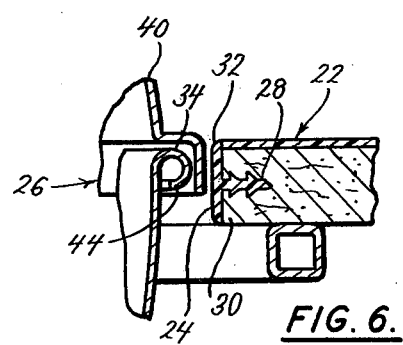
FIG. 6.

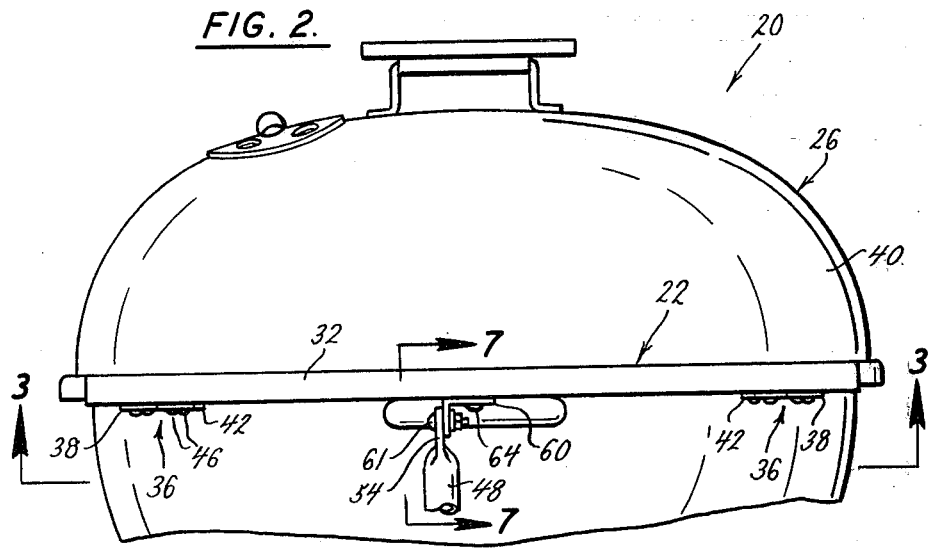
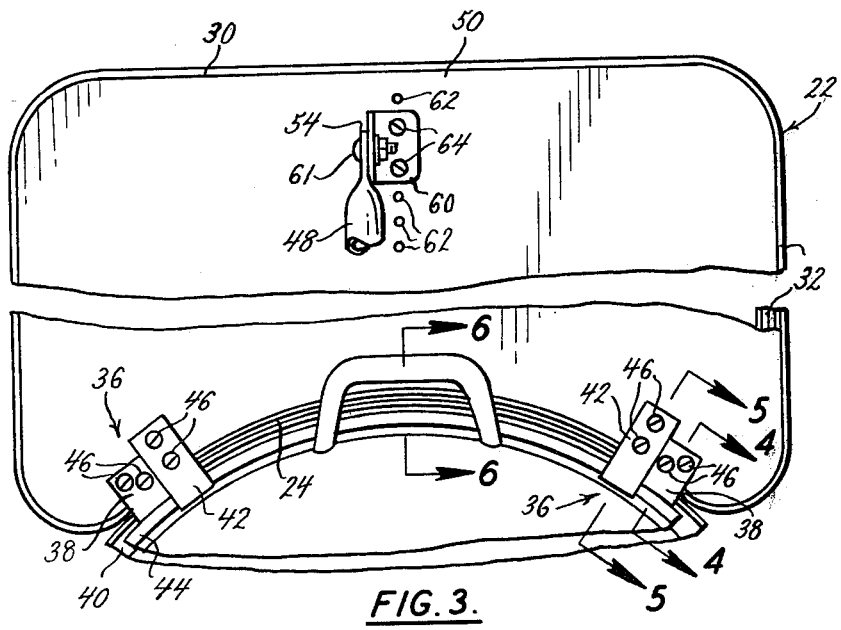
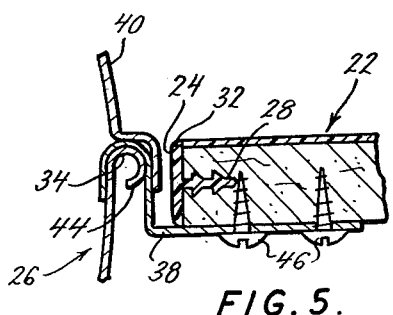
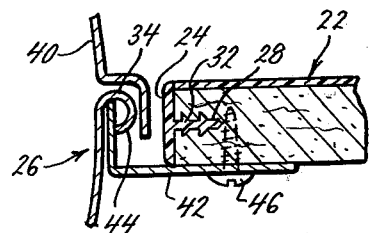

ACCESSORY TABLE FOR PORTABLE KETTLE TYPE BARBECUE GRILL

BACKGROUND AND SUMMARY

Kettle type barbecue grills, including the widely known WEBER TM grill are immensely popular for use in barbecuing all sorts of meats with all sorts of sauces and marinades which are applied to the meat while being grilled. Generally, these kettle type grills are spherically shaped with the upper one-third being a removable cover and the lower two-thirds containing a cooking grill with space at the bottom for charcoal. A lip having a rolled edge surrounds the upper periphery of the lower kettle portion and forms the resting surface for the cover. A handle is usually provided in the center of the cover such that it may be conveniently lifted from the grill, with a hook in the interior of the cover for hanging the cover on the side of the grill. A large majority of these kettle type grills are freely movable as they include three support legs, with an axle extending between two of the support legs and wheels rotatably mounted thereto with an interconnecting framework extending between all the legs, the third leg resting on the ground to hold the grill in place. Thus, the kettle type barbecue grills provide a totally enclosed cooking surface which is easily transportable and which has a removable cover to gain access to the grill for applying sauces and the like.

Unfortunately, unlike some other barbecue grills, a work table or accessory table is not generally provided with a kettle grill although it is almost a necessity for holding the various sauces, meat trays, condiments and spices, and refreshment for the cook in close proximity to the cooking area. Usually, a separate TV tray or small table must be set up and located as close to the grill as possible. This is quite inconvenient and does not adequately solve the problem as TV trays and the like are not very stable, not tall enough, and generally provide a very small working surface. The height of the table not only makes it inconvenient to apply sauce to the meat, but it also puts any food including finished barbecue placed thereon in danger of pilferage by neighborhood pets.

At least one manufacturer has offered an accessory table for use with its kettle grill, but it has met with very little acceptance. This prior art table has separate support legs on one side and structure to attach to the handle along the edge of the grill at its other side. Thus, the table leans against the edge of the kettle which is held in place by only one of its support legs. If the kettle grill or table should accidentally be bumped, it is quite likely that the grill would be set in motion which would separate the table from the grill and allow the items supported thereon to crash to a concrete patio or the like. As the table is supported by the ground, it must be set up after the grill has been rolled into position and thus detracts from the portability thereof. Furthermore, the price for these tables has generally approached that charged for the entire grill itself and with its limited utility, its sales have not approached those of the grills.

To solve these and other problems existing in the prior art, and to fulfill a long felt need, applicant has succeeded in developing a work table kit which may be conveniently assembled and attached to a kettle grill and which provides a sufficiently large work area to accommodate the many items needed to barbecue, all without detracting from the portability of the grill.

Applicant's work table includes a table top surface with an edge thereof contoured to match the curvature of the side of the grill. The table may be made of wood, particle board, or FORMICA TM as is used in kitchen countertops with a groove cut along its periphery to mount a plastic Tee molding to improve its appearance. Indeed, applicant has been successful in using sink cutouts from counters for his table surface which would otherwise have been scrapped and which are generally available at a reduced price.

Two pairs of stainless steel clips secure the contoured edge of the table in a spaced apart orientation to the side of the grill, with one clip in each pair sliding over the top of the lip of the grill and the other clip sliding up underneath the rolled edge of the lip. These clips are then secured to the lower surface of the table top with small screws so that the lip of the grill is captured within the clips. A strut member extends from the outer edge of the table top and down to the axle which supports the two wheels of the grill. A swivel mount attaches the upper end of the strut to the lower surface of the table top and a series of pilot holes may be pre-drilled in the table top to permit leveling of the table top to suit the owner's preferences. For example, if barbecuing is usually performed on a slanted driveway or the like, the table top need not be leveled with the surface of the grill but instead may be leveled against the slanted driveway.

The lower end of the strut has a strengthening insert which may be a wood dowel or the like and held in position by dimpling along the outside periphery of the strut. The strut itself may be a hollow aluminum tubing. A notch or slot is cut into the lower end of the strut and insert of a size which will receive the axle of the grill so that the strut and insert extends slightly below the axle. A hole is drilled through that portion of the strut and insert which extends below the axle and a retaining pin is slipped through the hole to act as a catch and secure the lower end of the strut and insert to the axle and prevent its being inadvertently removed therefrom. The retaining pin may be a simple aluminum roofing nail which has a flattened head and ridges formed along its shank which helps secure it within the hole and prevent it from being jarred out of position. The position of the strut is chosen such that it passes immediately adjacent the third support leg and a plastic tie wrap is used to secure the strut along a medial portion thereof to the support leg and further help stabilize the work table.

Thus, using applicant's kit, one may easily install an accessory table to any kettle grill which is positively secured thereto at both of its sides and supported by a strut member extending all the way beneath the kettle grill and to the axle support. The table solves the problem of where to put the various sauces, condiments, and the like while barbecuing and eliminates the bothersome task of separately positioning an unstable TV tray or the like, which is inadequate and subject to being overturned. Furthermore, the accessory table does not detract from the portability of the kettle grill and indeed may itself be used as a handle to wheel the kettle grill about, if desired.

Applicant has briefly summarized some of the features of his invention. These and other features may be more fully understood by reading and reviewing the drawings and preferred embodiment which follows.

BRIEF DESCRIPTION OF THE DRAWINGS

FIG. 1 is a perspective view of a kettle type barbecue grill with applicant's accessory table installed thereon;

FIG. 2 is a partial front view of the accessory table and grill detailing the strut mounting to the table top;

FIG. 3 is taken along the plane of line 3—3 in FIG. 2 and shows the mounting clips attached to the rolled edge of the lip and the bracket mounting the upper end of the strut;

FIG. 4 is a cross-sectional view taken along the plane of line 4—4 in FIG. 3 showing the lower clip mounting and Tee molding;

FIG. 5 is a cross-sectional view taken along the plane of line 5—5 in FIG. 3 and showing the upper clip mounting and Tee molding;

FIG. 6 is a cross-sectional view taken along the plane of line 6—6 of FIG. 3 showing the table top resting on the kettle grill handle;

FIG. 7 is a partial cross-sectional view taken along the plane of line 7—7 in FIG. 2 and detailing the bracket mounting for the upper end of the strut; and FIG. 8 is a cross-sectional view taken along the plane of line 8—8 in FIG. 1 and detailing the strengthening insert, retaining pin and axle mounting of the lower end of the strut.

DETAILED DESCRIPTION OF THE PREFERRED EMBODIMENT

Applicant's accessory table kit 20 includes a table top surface 22 which has an inner edge 24 contoured to approximate the circular contour of the kettle grill 26. A groove 28 is cut into the periphery 30 of table top 22 to receive a Tee molding 32 which may be glued or otherwise secured thereto for decorative purposes. The contour or inner edge 24 is secured to the lip 34 of grill 26 with one or more pairs 36 of clips. An upper clip 38 is shaped to slide over the edge of the lip 34 and follow its contour such that it does not interfere with the replacement of cover 40 over the grill 26. A lower clip 42 extends upwardly and fits within the rolled edge 44 of lip 34 such that each clip pair 36 captures the lip 34 therebetween. Each clip 38, 42 is secured to the lower surface of table top 22 by one or more wood screws 46. It should be noted that lower clip 42 may be sufficiently tall to provide a secure clamping of lip 34 with upper clip 38, but that this is not necessary. Instead, a looseness of fit may be provided which reduces the thermal bond between the clip pair 36 and accordingly reduces the transfer of heat from the kettle 26 to the table top 22. In applicant's preferred embodiment, two clip pairs 36 are provided, one at either side of table top 22 so that a spaced apart mounting is provided which increases the relative stability between the table top 22 and grill 26. However, two clip pairs 36 are not strictly required to perform this function. Each clip pair 36 does provide a free air space between the inner edge 24 and the kettle grill 26 which prevents any damage to table top 22 which might otherwise be caused by excessive heating in the grill 26. Clips 38, 42 may be made of stainless steel or the like which can withstand the heat of the grill and resist rusting or deterioration from exposure to the weather.

A strut 48 supports the outer edge 50 of table top 22 from the axle 52 of grill 26. The strut 48 is generally a hollow tubular member or the like with its upper end flattened to form a mounting tab 54. Either a single length of aluminum tubing, or two interlocking sections may be used to form strut 48. With a multi-piece strut 48, a more complete kit may be assembled. A hole 56 is drilled through mounting tab 54 and matches and lines up with hole 58 in a mounting bracket 60 to form a swivel mount. A bolt and nut assembly 61 secures mounting tab 54 to mounting bracket 60. A series of pilot holes 62 are drilled into the lower surface of table 22 in a line perpendicular to and near its outer edge 50 and one or more wood screws 64 may be used to attach the mounting bracket 60 through holes 65 to the lower surface of table top 22.

The lower end of strut 48 has a strengthening insert 66 which may be made a wood dowel or the like which is held in place by a series of dimples 68 around the periphery of strut 48. A slot 72 is formed through the insert 66 and strut 48 forming a pair of legs 73 with dimensions which allow them to substantially align with and extend beyond axle 52. A hole 74 extends through each leg 73 below the point at which the axle 52 contacts the slot 70. A retaining pin 75, which may be an aluminum roofing nail or the like has a flattened head 76 and a shank 78 with ridges 80 along the shank 78 and near its head 76. Retaining pin 75 slides through hole 72 and secures the lower end of strut 48 to axle 52 and ridges 80 prevent is being jarred loose. A plastic tie wrap 82 wraps around a medial portion of strut 48 and the third support leg 84 of the kettle grill 26 which further stabilizes the table 22.

OPERATION

Applicant's accessory table may be provided in kit form and is designed for simple and convenient installation without the use of any drills or saws, but only a common screw driver. Thus, virtually any grill owner would be more than capable of installing his own table. Before beginning installation, the top clips and the strut mounting bracket are secured to the table. The bottom clips may be loosely attached with only one screw and rotated away from the grill.

The lower end of the strut is then attached to the axle by slipping its legs and slot therearound and inserting the retaining pin through its hole. The table may then be secured to the grill by hooking the upper clips over the lip of the grill so that the table top is loosely supported therefrom. The upper end of the strut is then tightly bolted to its mounting bracket. The lower clips are then rotated underneath the rolled edge of the lip and the extra wood screws installed and tightened which should positively secure or capture the lip of the grill within the clips. The table may then be checked for the desired level and if adjustment is desired, the outer edge of the table top may be supported by hand as the mounting bracket is loosened from the strut, removed from the table top, and repositioned to achieve the desired alignment and tightened. Of course, as the outer edge of the table top is lowered the mounting bracket is moved further away from the drill, and vice versa. After the desired level has been achieved, the plastic tie wrap may be secured to the strut and support leg. In this manner, applicant's accessory table may be rapidly and easily installed to any kettle grill to provide a convenient accessory table or work area which is virtually a necessity for convenient barbecuing.

Various changes and modifications would be apparent to one or ordinary skill in the art upon reading applicant's disclosure of his preferred embodiment. These alterations are included in the teaching of applicant's invention and he intends that his invention be limited only by the scope of the claims appended hereto

We claim:

1. A work table for a barbecue grill, the barbecue grill being supported by a pair of wheels rotatably mounted to an axle and a support leg, said grill being thereby repositionable by lifting the side of the grill adjacent said support leg and moving the grill so that it rolls on said wheels, said kit including a table, clip means for attaching one side of said table proximate to said grill cooking surface, said grill having a lip with said clip means adapted to attach to said lip, and a strut sufficiently long to extend from substantially near the outer edge of said table and diagonally beneath the grill to said axle, and means to attach said strut to said axle to thereby provide a support for said table which maintains the same degree of portability for the grill as without said work table kit installed.

2. The kit of claim 1 further comprising means to adjust the angle at which said table may be mounted to said grill.

3. The kit of claim 2 wherein said adjusting means includes means to vary the position at which said strut is mounted to said table.

4. The kit of claim 1 wherein the said clip means includes an upper clip for sliding over the top of said lip and a lower clip for fitting against the lower edge of said lip, and means to mount said clips to the table and thereby secure said lip between said clips.

5. The kit of claim 4 wherein said clips are stainless steel and the mounting means includes screws for fastening said clips to the lower surface of the table.

6. The kit of claim 1 wherein said grill has a cover for enclosing the cooking surface, said clip means conforming to the contour of the lip to provide minimal interference with the fit between said cover and said lip.

7. The kit of claim 1 wherein said table further comprises a Tee moulding secured to its periphery.

8. The kit of claim 1 wherein the grill is in the approximate shape of a kettle, the lip thereof being arcuate in shape, the inner side of the table having substantially the same arcuate shape, the clip means mounting said table in a spaced apart relationship to said lip.

9. The kit of claim 1 wherein said strut is a hollow tube, said strut attaching means including a strengthening insert disposed in the end of said strut with means defining a slot in said strut and insert to receive the axle, and a retaining pin for extending across said slot to capture said axle within said slot, said strut and insert having means defining a hole for receiving said pin.

10. The kit of claim 9 wherein said pin has a flattened head, a shank, and ridges around said shank to retain said pin within its hole.

11. The kit of claim 1 further comprising a tie means to secure said strut at a medial point thereof to said support leg.

12. A work table kit for a kettle type barbecue grill, said grill having a lip and supported by a pair of wheels rotatably mounted to an axle and a support leg, said grill having a removable cover, the kit including a table, clip means for attaching one side of said table proximate to said grill cooking surface, said clip means including at least one upper clip adapted to closely fit over the lip of the grill and an associated lower clip adapted to fit underneath the lip, the lip having an edge so that said clips capture the edge therebetween, each clip being fastened to the lower surface of the table, a strut, a swivel mount for an upper end of said strut, means to fasten the swivel mount to the lower surface of the table and near its outer edge, and means to mount the lower end of the strut to the grill axle so that once installed, the work table does not interfere with the portability of the grill.

13. The kit of claim 12 wherein the strut is a hollow tube, and the lower end mounting means includes a strengthening insert disposed in the end of said strut with means defining a slot in said strut and insert to receive the axle, and a retaining pin for extending across said slot to capture said axle within said slot, said strut and insert having means defining a hole for receiving said pin.

* * * * *